United States Patent
Raissinia et al.

(10) Patent No.: US 7,558,553 B1
(45) Date of Patent: Jul. 7, 2009

(54) ADVANCE SIGNALING FOR MULTI-STAGE TRANCEIVERS

(75) Inventors: Alireza Raissinia, Monte Sereno, CA (US); Gregory Taylor, Woodside, CA (US); Gregory Raleigh, Woodside, CA (US); Michael Pollack, Cupertino, CA (US); Vincent K. Jones, IV, Redwood City, CA (US)

(73) Assignee: Cisco Technology, Inc., San Jose, CA (US)

(*) Notice: Subject to any disclaimer, the term of this patent is extended or adjusted under 35 U.S.C. 154(b) by 1989 days.

(21) Appl. No.: 09/748,760

(22) Filed: Dec. 21, 2000

(51) Int. Cl.
*H04B 1/06* (2006.01)
*H04B 7/00* (2006.01)

(52) U.S. Cl. .............. 455/277.1; 455/232.1; 455/67.13; 455/277.2

(58) Field of Classification Search .............. 455/67.11, 455/67.13, 67.14, 562, 226.1–226.2, 231, 455/232.1, 277.1–277.2, 69, 68, 226.3, 522, 455/518, 517, 511, 250.1, 561, 562.1, 138, 455/140, 233.1, 279.1, 466; 370/330, 311, 370/348
See application file for complete search history.

(56) References Cited

U.S. PATENT DOCUMENTS

| | | | | |
|---|---|---|---|---|
| 4,031,469 A | * | 6/1977 | Johnson | 455/226.4 |
| 5,371,734 A | * | 12/1994 | Fischer | 370/311 |
| 5,691,729 A | * | 11/1997 | Gutman et al. | 455/277.2 |
| 5,737,687 A | | 4/1998 | Martin et al. | 455/14 |
| 5,929,718 A | | 7/1999 | Crosby | 333/24 |
| 5,983,111 A | * | 11/1999 | Kim | 455/466 |
| 6,490,727 B1 | * | 12/2002 | Nazarathy et al. | 725/129 |
| 6,556,559 B1 | * | 4/2003 | Mitsume et al. | 455/226.2 |
| 6,603,810 B1 | * | 8/2003 | Bednekoff et al. | 375/228 |
| 6,650,628 B1 | * | 11/2003 | Boch | 370/330 |
| 6,668,161 B2 | * | 12/2003 | Boros et al. | 455/67.14 |
| 2001/0015963 A1 | * | 8/2001 | Tuomainen et al. | 370/311 |

* cited by examiner

*Primary Examiner*—John J Lee
(74) *Attorney, Agent, or Firm*—Cindy Kaplan

(57) ABSTRACT

Systems and methods for advanced signaling between stages of transmitters and/or receivers in a digital communication system. One or more intermediate frequency signals and one or more control signals may share the same cable. Also, systems and methods are provided for calibrating head end receiver gain to improve subscriber unit power control loop performance.

6 Claims, 7 Drawing Sheets

ADVANCE SIGNALING FOR MULTI-STAGE TRANCEIVERS

BACKGROUND OF THE INVENTION

The present invention relates to digital communication systems and more particularly to digital communication systems employing multi-stage transceivers.

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose. The point to multipoint system includes both a hub or a head end and numerous subscriber units associated with individual residences or businesses. For both the subscriber unit and head end, there is a transceiver including both a transmitter and a receiver. Both the transmitter and receiver incorporate various stages. Special problems arise in signaling among the stages as will be explained.

One problem arises in passing signals between physically distinct components of the subscriber unit. For optimal network performance, it is desirable that the subscriber unit employ an outdoor antenna. The source and sink of data at a business or residence will however likely be a computer located inside a building. If the subscriber unit were to be integrated within one physical package inside the building in proximity to the computer, a problem arises in that RF signals will attenuated by the cable between the indoor subscriber unit housing and the outdoor antenna. If the subscriber unit is a single physical package outside the house at the antenna location, another problem arises in that high speed unmodulated data passing back and forth between the computer and subscriber unit may be corrupted over the relatively long distance between the subscriber unit and computer.

Therefore, it is desirable to divide the subscriber unit components between an indoor unit and an outdoor unit. The outdoor unit includes components that operate at microwave frequencies. The indoor unit performs packet processing, baseband signal processing, and processing at an intermediate frequency (IF) suitable for low-loss coupling between the indoor unit and outdoor unit. The outdoor unit can then convert between the IF signal and the RF signal at microwave frequency.

Numerous signals, however, must pass between the indoor unit and outdoor unit including the transmitted and received IF signals, a frequency reference signal, frequency adjustment information, and power control. Yet it is impractical to pass multiple cables between the indoor unit and outdoor unit because this would greatly complicate installation and maintenance.

Another interstage signaling problem arises at the head end. The head end needs to regulate the upstream transmission power level used by each subscriber unit. If this transmission power level is too low, the subscriber unit signal received at the head end will be too weak to accurately recover the transmitted digital data. If this transmission power level is too high, the subscriber unit signal may saturate the head end receiver or cause interference to communication links operating outside network 100. For example, network 100 may be a single cell of a multicellular system and excessive transmission power may cause interference to other cells.

To regulate subscriber unit transmission power, the head end will typically pass power control commands to subscriber units. The power control commands are determined based on a received signal level measurement made within the head end receiver. This measurement is made within the head end receiver after several stages of receiver processing including RF filtering, downconversion to an intermediate frequency, and various other filtering and processing stages. However, the signal gain through these premeasurement components will vary over time and among head end units. Because recovery of the transmitted data occurs after the measurement point, the variation of this signal gain and the resulting variation of subscriber unit transmission power will not affect head end receiver power, however, an increase in subscriber unit transmission power due to receiver gain changes rather than channel conditions will potentially cause interference to cells outside network 100.

It is therefore desirable to measure the head end receiver gain and compensate for it in the operation of the subscriber unit power level control loop. However during operation it is difficult to accurately measure head end receiver gain because although the signal level at the measurement point is known, there is no easy way to measure the signal level incident at the antenna.

What is needed are systems and methods for interstage signaling that address the problems noted above.

SUMMARY OF THE INVENTION

Systems and methods for advanced signaling between stages of transmitters and/or receivers in a digital communication system are provided by virtue of one embodiment of the present invention. One aspect of the invention provides for one or more intermediate frequency signals and one or more control signals on the same cable. Another aspect of the invention provides systems and methods for calibrating head end receiver gain to improve subscriber unit power control loop performance.

Further understanding of the nature and advantages of the invention herein may be realized by reference to the remaining portion of the specification and the attached drawings.

DESCRIPTION OF SPECIFIC EMBODIMENTS

A point to multipoint communication system is one example of an application of the present invention. The present invention is, however, of course not limited to point to multipoint communication systems but also finds application in e.g., point to point or peer to peer communication systems.

Figure 1:
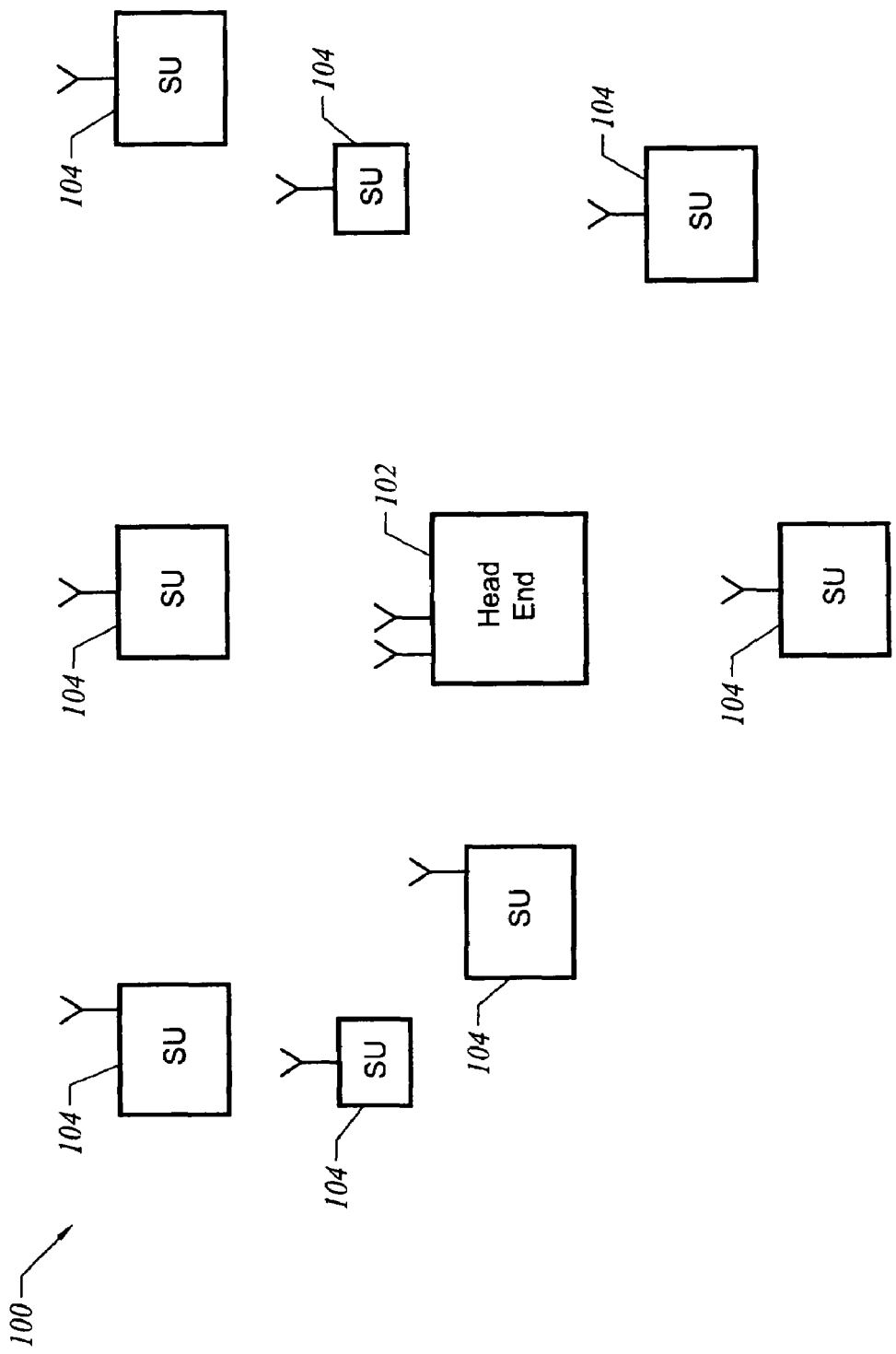
FIG. 1 depicts a point multipoint communication system according to one embodiment of the present invention.

FIG. 1 depicts a representative point to multipoint communication system. A network 100 includes a central access point or head end 102 and multiple subscriber units 104. All communications typically is either to or from head end 102. Communication from head end 102 to one or more subscriber units 104 is herein referred to as downstream communication. Communication from any one of subscriber units 104 to head end 102 is herein referred to as upstream communication. In one embodiment, different frequencies are allocated to upstream and downstream communication. In order to coordinate communication along multiple subscriber units via a common upstream frequency, a medium access control (MAC) protocol is provided. In one embodiment, the MAC protocol employs time division multiple access (TDMA) wherein time slots are allocated to individual subscriber units for upstream transmission. An exemplary MAC protocol of this type is the so-called DOCSIS protocol described in the Data-Over-Cable Service Interface Specifications, Radio Frequency Interface Specifications, SP-RFI-I04-980724, (Cable Television Laboratories, 1997), the contents of which are herein incorporated by reference.

Figure 2:
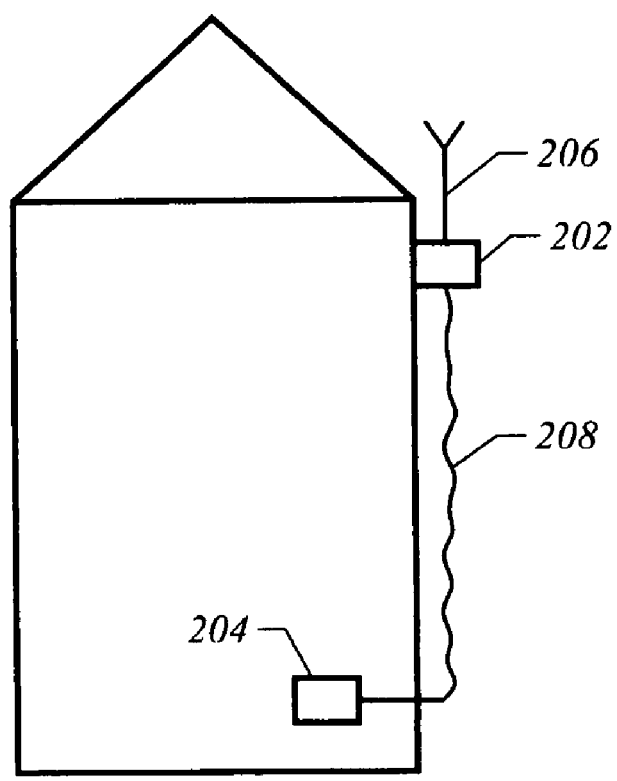
FIG. 2 depicts a typical subscriber unit installation according to one embodiment of the present invention.

Subscriber units 104 will typically be installed at residences or businesses. FIG. 2 depicts an exemplary installation of a subscriber unit at a building. Each subscriber unit 104 includes an interface to a computer, set-top box, and/or computer network, telephone, television. Each subscriber unit 104 also includes circuitry for operating the relevant MAC layer protocol, circuitry for digitally processing information according to the relevant physical layer modulation scheme, digital to analog and analog to digital conversion circuitry, analog intermediate frequency (IF) amplification and filtering, as well as radio frequency (RF) amplification and filtering. Some of the circuitry will be duplicated for the transmitter and receiver. If the transmitter and/or receiver take advantage of multiple antennas certain portions of the circuitry will also be duplicated for each antenna.

The wireless transmission medium between head end 102 and subscriber unit 104 may exploit frequencies such as microwave frequencies and/or millimeter wave frequencies. For optimal network performance, subscriber units 104 should employ outdoor antennas. Cable losses make it undesirable to simply transfer millimeter wave or microwave signals between an indoor subscriber unit and an outdoor antenna via cable. Furthermore, it is also undesirable to locate the entire subscriber unit at an outdoor location adjacent to the antenna because of the need for high speed data connections to the data sinks and/or sources within the residence.

FIG. 2 depicts the division of subscriber unit 104 into an outdoor unit 202 and indoor unit 204. The outdoor unit is directly connected to an outdoor antenna 206. The antenna may be physically integrated with the outdoor antenna. Indoor unit 204 includes an interface to a data sink and/or source, a MAC layer processor, baseband physical layer signal processing, IF amplification and filtering and conversion between digital and analog signals. IF transmitter and receiver signals are exchanged between indoor unit 204 and outdoor unit 202 via a cable 208. Outdoor unit 202 includes RF amplification and filtering including low noise amplification for the receiver and power amplification for the transmitter. Outdoor unit 202 also includes a mixer and additional circuitry for converting between RF and IF frequencies. Correct output power level and the desired transmit and receive frequencies are determined within indoor unit 204. According to the present invention, transmit and receive IF signals and control and synchronization signals may all travel via common cable 208. Cable 208 may be an RG58 cable or equivalent for residential applications. For commercial applications, LMR400 cable may be substituted.

Figure 3:
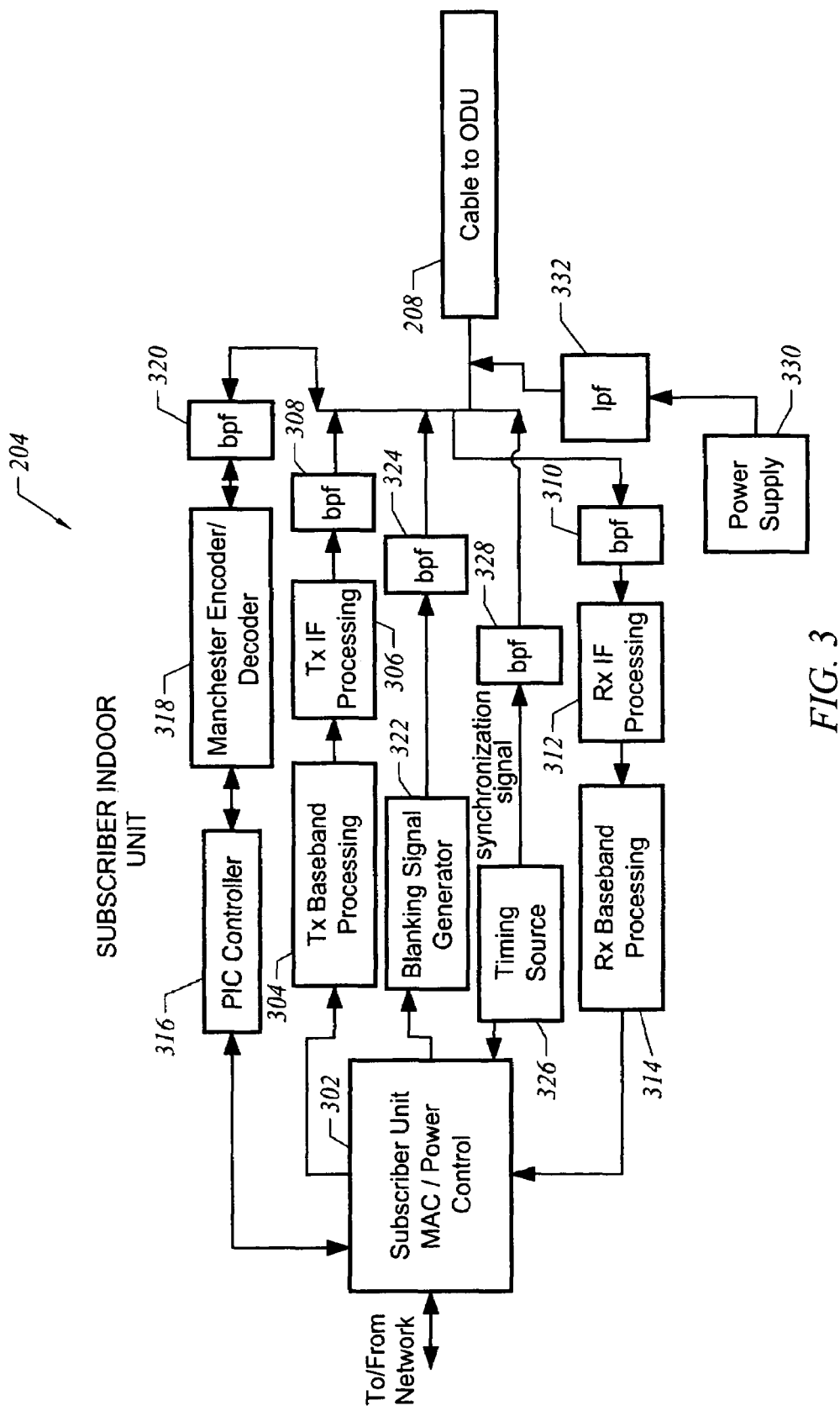
FIG. 3 is a block diagram of the indoor portion of a subscriber unit according to one embodiment of the present invention.

FIG. 3 depicts indoor unit 204 according to one embodiment to the present invention. A subscriber unit MAC/power control block 302 interfaces with a network and/or computer or other data sync or source. Block 302 translates between higher level network protocols, such as IP and the operative MAC protocol. Block 302 also requests upstream transmission times and coordinates upstream data transmission responsive to a schedule grant from head end 102. Another function of block 302 is to control the upstream transmission power level of subscriber unit 104 in response to downstream power control messages from head end 102.

Upstream MAC data to be transmitted begins physical layer processing by being transferred to a transmitter baseband processing block 304. Transmitter baseband processing block 304 performs forward error correction coding, mapping of the data into symbols, other modulation related signal processing functions, and conversion of the digital signal to analog. A transmitter IF processing block 306 converts the baseband analog signal to a signal at an intermediate frequency (IF). Transmitter IF processing block 306 also amplifies and filters the analog signal. A band pass filter 308 further filters the IF analog signal. The IF signal output of the band pass filter 308 is coupled to cable 208. As will be explained, many signals share cable 208 by being frequency multiplexed.

Also sharing cable 208 is a receiver IF signal from outdoor unit 202. The signal passes through a band pass filter 310 and then onto receiver IF processing block 312. Receiver IF processing block 312 filters and amplifies the IF signal and converts it to a base band analog signal. A receiver baseband processing block 314 converts the analog base band signal to digital, filters the digital signal, performs various demodulation related processing functions, performs error correction decoding, and presents the recovered data to block 302.

The actual transmit and receive RF frequencies are set by the operation of outdoor unit 202 under the control of block 302 within indoor unit 204. Data representing the desired frequencies is sent from indoor unit 204 to outdoor unit 202. Also indoor unit 204 sets the transmission power level of outdoor unit 202. Various other status information such as synthesizer lock state, power fail state, etc. may be exchanged between outdoor unit 202 and indoor unit 204. Accordingly, indoor unit 204 includes a programmable interface controller or a PIC controller 316. In one embodiment, PIC controller 316 serves as a data interface between indoor unit 204 and outdoor unit 202. PIC controller 316 is a PIC 16F877 controller available from Microchip Technology, Inc. of Chandler, Ariz. PIC controller 316 also performs control and monitoring functions for transmitter IF processing block 306 and receiver IF processing block 312. These IF control functions are not discussed here.

Power and frequency control commands from block 302 to outdoor unit 202 are processed by PIC controller 316. The data to be transferred to outdoor unit 202 is Manchester encoded by a Manchester encoder/decoder 318. The Manchester encoded data then passes through a band pass filter 320 which is coupled to cable 208. In one embodiment, PIC controller 316 and Manchester encoder/decoder 318 operate a half duplex 125 Kbps Manchester encoded two way serial communication channel.

To transmit power control information, first, an eight bit data word representing a desired power attenuation level is transmitted to outdoor unit 202 via PIC controller 316. However the power adjustment itself should occur at a precise time controlled by block 302. Accordingly, a blanking signal generator 322 outputs a 48 MHz signal that is keyed on and off for power adjustment timing control. When the 48 MHz signal is turned on, that indicates that a previously loaded power adjustment from PIC control 316 should be put into effect immediately. This 48 MHz carrier is coupled to cable 208 via a band pass filter 324.

Indoor unit 204 and outdoor unit 202 should also share a common understanding of system timing. A timing source 326 generates a 24 MHz reference signal. The synchronization signal flows to block 302 and other elements of indoor unit 204 and is coupled to cable 208 via band pass filter 328.

A 48 volt DC power supply voltage is also passed to outdoor unit 202 via cable 208. This voltage is generated by a power supply 330 and filtered by a low pass filter 332.

Figure 4:
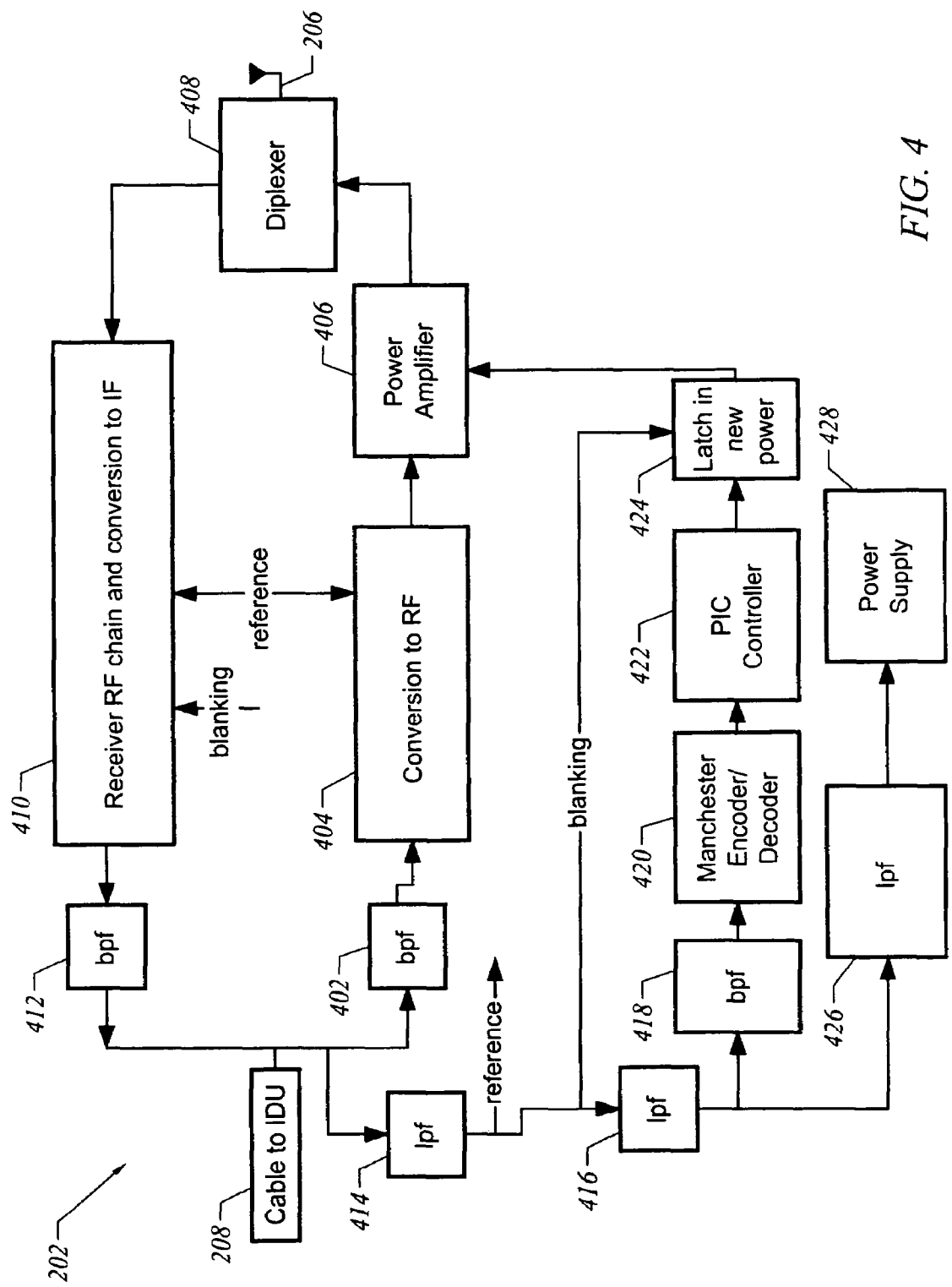
FIG. 4 depicts the outdoor portion of a subscriber unit according to one embodiment to the present invention.

FIG. 4 depicts outdoor unit 202 according to one embodiment of the present invention. For the transmit signal, a band pass filter 402 isolates the transmit IF signal and passes it along to a "conversion to RF" block 404. Block 404 incorporates a mixer to convert the IF signal to RF frequency by mixing the IF signal with a local oscillator signal derived from the 24 MHz reference signal. The RF signal is then amplified by a power amplifier 406 and passed through a diplexer 408 which is coupled to antenna 206.

The RF receive signal from head end 102 is received by antenna 206 and is input to diplexer 408 and from there passed along to an analog receiver block 410. Analog receiver block 410 performs low noise amplification, RF filtering, and conversion to the receiver IF frequency. Block 410 incorporates a mixer which also takes advantage of the 24 MHz reference signal in converting to the IF frequency. The receiver IF signal is filtered by a band pass filter 412 prior to being forwarded to indoor unit 204 via cable 208.

A low pass filter 414 isolates the DC power, 24 MHz reference signal, 48 MHz blanking signal, and the Manchester encoded data stream from the transmitter IF and receiver IF signals. Low pass filter 414 preferably has a 100 MHz cutoff. The 48 MHz blanking signal and the 24 MHz reference signal are obtained from the output of low pass filter 414.

The output of low pass filter 414 is also coupled to the input of another low pass filter 416 that preferably has a 10 MHz cut off. The Manchester serial data is coupled from low pass filter 416 via a band pass filter 418 to a Manchester encoder/decoder 420. Band pass filter 418 preferably has a 750 KHz center frequency and a 500 KHz bandwidth. Manchester encoder/decoder 420 decodes data received from indoor unit 204 and encodes data transmitted to indoor unit 204. A PIC controller 422 similar to PIC controller 316 controls transmission frequency, reception frequency, and output power according to the data received from indoor unit 204 via Manchester encoder/decoder 420. PIC controller 422 is similar to PIC controller 316 in indoor unit 204. Transmission and reception frequencies are controlled by varying local oscillator frequencies within RF conversion block 404 and analog RF receiver block 410. A new power level is latched into power amplifier 406 by a latch 424 when the 48 MHz blanking signal is activated.

The output of low pass filter 416 is also coupled to the input of a further low pass filter 426 that preferably has a cutoff frequency of 1 MHz. DC power is obtained from the output of low pass filter 426. A DC to DC converter 428 generates needed supply voltages based on the 48 volt DC power obtained from indoor unit 204.

Figure 5:
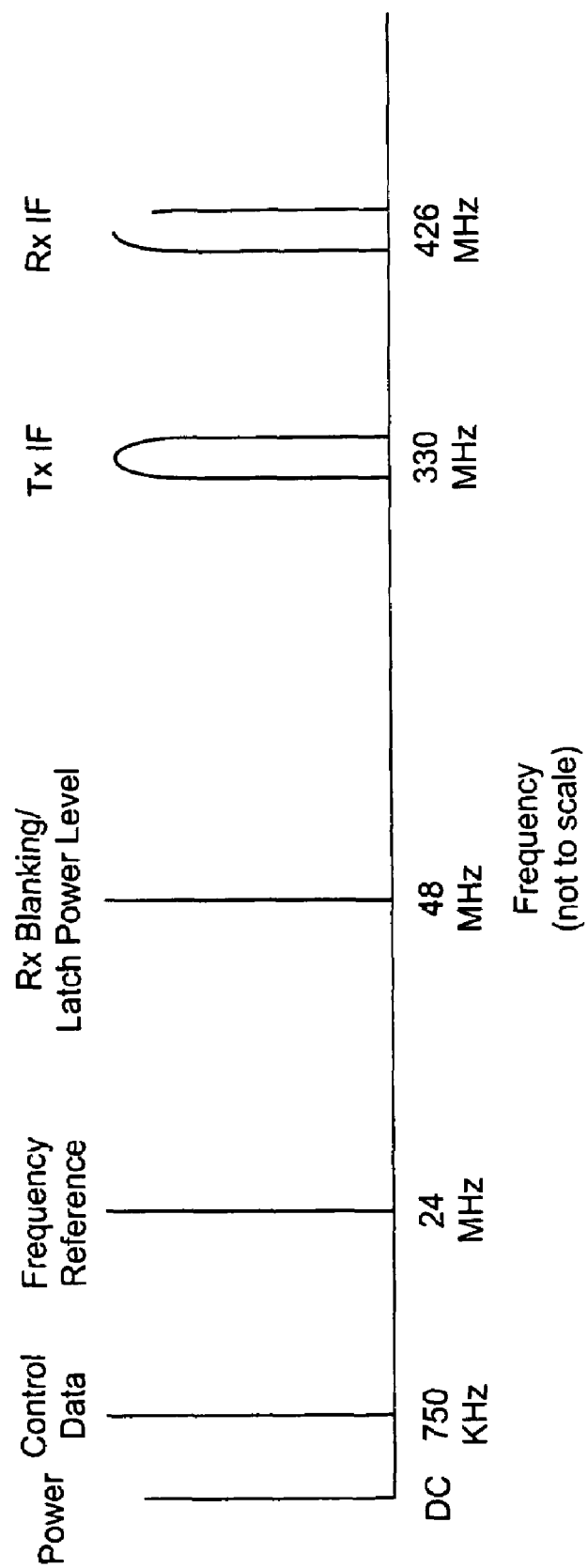
FIG. 5 depicts how multiple signals can be combined in the frequency domain on a single cable between indoor and outdoor portions of the subscriber unit according to one embodiment of the present invention.

FIG. 5 depicts the signals on cable 208 in the frequency domain. The modulated receiver IF signal is at 426 MHz. The modulated transmitter IF signal is at 330 MHz. The blanking signal which is used to latch new desired power level is a sinusoid at 48 MHz. The blanking signal is either on or off. When the signal is turned on a new power level is adopted by changing the attenuation within power amplifier 406. The signal is typically turned on right before a transmission by subscriber unit 104. The blanking signal is only one example of an amplitude shift key (ASK) waveform that can signal a switching time by changing its amplitude.

The 24 MHz sinusoid is the frequency reference signal. The Manchester encoded control data which travels between indoor unit 204 and outdoor unit 202 is at 750 KHz with only one end transmitting at a time. There is also the 48 volt DC power signal. At both ends of cable 208 these various signals are coupled to the cable by bandpass and lowpass filters as shown in FIG. 3 and FIG. 4. It will be appreciated also that impedances must be matched appropriately for all of the filters coupled to cable 208.

Another aspect of the present invention addresses interstage signaling to measure and adjust the gain of the receiver of head end 102. For optimal network performance head end 102 operates a power control loop that measures the received signal strength of signals transmitted upstream by individual subscriber units 104 and sends downstream signals to adjust their power for optimal network operation. To support accurate operation of this power control loop, head end 102, according to one embodiment of the present invention, can measure the gain from the antenna to the point where receiver signal strength is measured for the power control loop.

Figure 6:
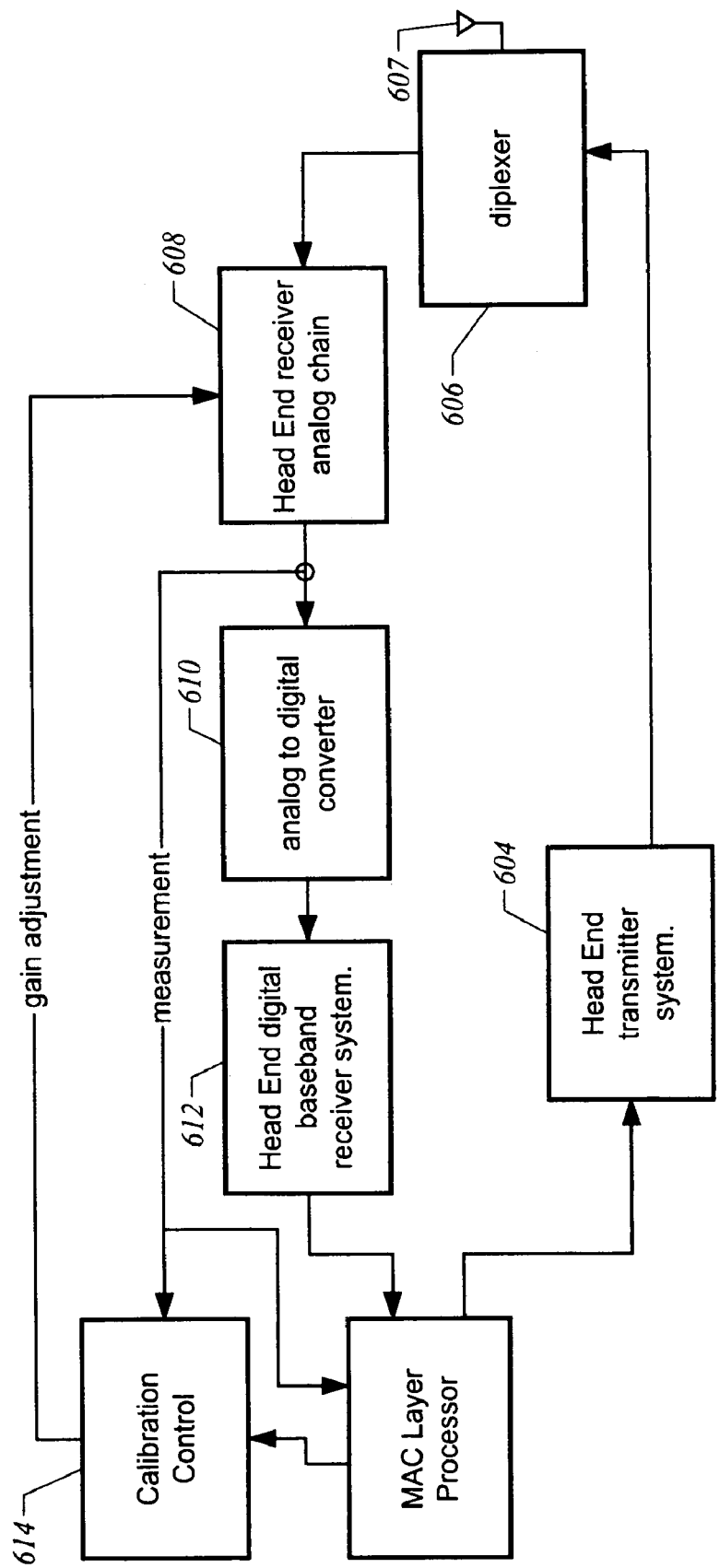
FIG. 6 depicts how head end receiver gain may be calibrated according to one embodiment of the present invention.

FIG. 6 depicts elements of head end 102 according to one embodiment of the present invention. Like with subscriber unit 104, functions may be divided between an indoor unit and an outdoor unit but this division is not shown here because it is not important to understanding the head end receiver gain calibration function. A MAC layer processor 602 controls overall MAC layer operation and provides MAC layer framing and deframing services. Data to be transmitted downstream is transferred in the form of MAC layer frames to a head end transmitter system 604. The details of the operation of head end transmitter system 604 are not important to the present invention and therefore not discussed in detail here. The output of head end transmitter system 604 is the RF signal which is forwarded to a diplexer 606 which is in turn coupled to an antenna 607.

Upstream signals are incident on antenna 607 and coupled through diplexer 606 to head end receiver analog chain 608. Head end receiver analog chain 608 includes amplification and filtering at the RF frequency and downconversion to an IF frequency, further filtering and amplification at the IF frequency, as well as downconversion to an analog base band signal. An analog to digital converter 610 converts the analog baseband signal to a digital signal. Further digital processing at baseband is provided by head end digital baseband receiver system 612 which performs further filtering, demodulation, and error correction decoding. The output of block 612 is MAC layer data that is forwarded to MAC layer processor 602. MAC layer processor 602 operates as the interface to a backbone network employing, e.g., IP.

To implement the power control loop, signal strength is measured at the input to analog to digital converter 610. MAC layer processor 602 takes this signal measurement and adjusts subscriber unit transmission power to maintain the signal strength within a desired range. In order to do this, MAC layer processor 602 sends special power control messages downstream through head end transmitter system 604. However, the signal strength measured at the input to analog to digital converter 610 will depend on the gain through head end receiver analog chain 608.

As the gain varies due to, for example, temperature variation, MAC layer processor 602 will adjust subscriber unit output power for this gain variation rather than any change in the subscriber unit's own power output or changes in attenuation through the wireless transmission medium. It is therefore desirable to measure the gain through head end receiver analog chain 608 so that subscriber unit output power will be set correctly. MAC layer processor 602 preferably chooses a time slot when no subscriber unit is transmitting upstream through head end receiver 608. This time slot is then used for gain measurement.

When MAC layer processor 602 detects that such a "quiet slot" is coming, it activates a calibration control block 614. Calibration control block 614 then measures the signal level at the input to analog to digital converter 610. The ratio of the measured signal level over the known thermal noise level at antenna 607 will then be the gain through diplexer 606 and head end receiver analog chain 608. This gain is then adjusted by calibration control block 614 so that the power control loop will continue to set the subscriber unit output power within a range that ensures accurate reception and that does not unduly interfere with upstream transmissions to other head ends. This gain adjustment is performed by changing an attenuator setting within head end analog chain 608. Preferably this calibration operation will only occupy a few milliseconds and will be performed once or twice a day. The necessary frequency of calibrations may depend on the degree of temperature variation at the head end location.

It should be noted that in one embodiment the signal that goes to head end receiver analog chain 608 and analog to digital converter 610 includes multiple frequency multiplexed upstream signals from different subscriber units that are then separated within head end digital base band receiver system 612. Calibration control will then require that all of these upstream subchannels be quiet during the calibration period.

Figure 7:
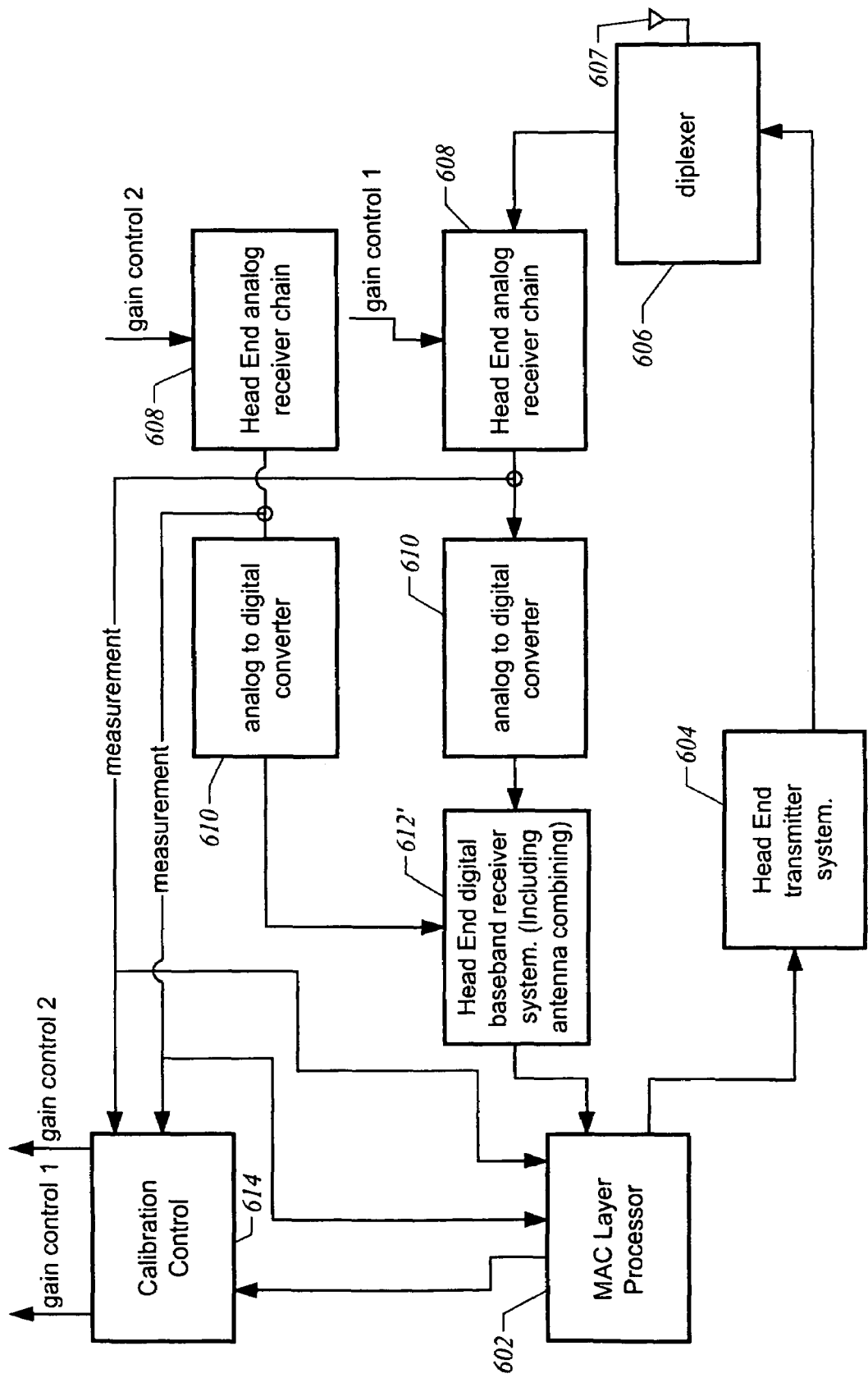
FIG. 7 depicts an alternative scheme for calibrating head end gain according to one embodiment of the present invention.

FIG. 7 depicts an alternative embodiment of head end 102 that employs a single transmit antenna but two receiver antennas. There are now two antennas 607. One of the antennas 607 is coupled to diplexer 606 and is thus used for both transmitter and receiver operation. There is a single head end transmitter 604 and MAC layer processor 602 as in FIG. 6. Also there is a single calibration control block 614. There is also a second antenna 607 used only for receiver operation to improve receiver performance by exploiting spatial diversity. There are head end analog chains 608 for each receiver antenna. There are also two analog to digital converters 610. A head end digital base band receiver system 612' performs all the same functions as head end digital base band receiver system 612 but also incorporates signal processing to beneficially combine the digital signals received from both antennas. Power control operation is now based on a combined measurement of the inputs of the two analog to digital converters 610.

The gains of both head end chains 608 may be calibrated independently as was described in reference to FIG. 6, that is, by waiting for a quiet time in upstream transmissions and then taking the ratio of measured signal level to thermal noise level to be the gain through each chain where one of the head end analog chains 608 will also have a gain associated with diplexer 606. The gains are measured independently and adjusted independently.

Alternatively, in this dual antenna embodiment, MAC layer processor 602 need not wait for a quiet time but may instead monitor receiver performance by exploiting an error rate indication developed by head end digital base band receiver system 612'. When the error rate is low for an extended time period, one head end analog chain 608 may be deactivated while receiver operation continues to rely on the other one. Because of the low error rate, channel quality is deemed to be sufficient to permit foregoing the advantages of spatial diversity during the calibration period. Now the gain for the inactive head end analog chain 608 may be calibrated while upstream communication continues uninterrupted. The head end analog chains 608 can then exchange roles with the newly calibrated analog chain being reactivated to allow for calibration of the one that had been left on. In one embodiment, deactivation of a head end analog chain involves switching the input to the chain into a dummy load and disconnecting it from the antenna 607.

It is understood that the examples and the embodiments described herein are for illustrative purposes only and that various modifications or changes in light thereof will be suggested to persons skilled in the art and are to be included within the full scope and purview of this application and scope of the appended claims and their full scope of equivalents. All publications, patents, and patent applications cited herein are hereby incorporated by reference in their entirety.

The invention claimed is:

1. In a TDMA system, a method for calibrating a gain of a head end receiver, said method comprising:
   monitoring an indication of reception quality;
   upon an indication of excellent reception quality, disconnecting a selected one of at least two antennas;
   while said selected one antenna is disconnected, measuring signal strength at a monitoring point in a receive chain coupled to said selected one antenna; and
   determining receiver gain based on said measured signal strength and a known noise level.

2. The method of claim 1 further comprising thereafter adjusting receiver gain to a desired level.

3. In a TDMA system, apparatus for calibrating a gain of a head end receiver, said apparatus comprising:
   a calibration control unit that 1) monitors an indication of reception quality, 2) upon an indication of excellent reception quality, disconnects a selected one of at least two antennas, that 3) while said selected one antenna is disconnected, measures signal strength at a monitoring point in a receiver chain coupled to said selected one antenna, and that 4) determines receiver gain based on said measured signal strength and a known noise level.

4. The apparatus of claim 3 wherein said calibration control unit thereafter adjusts receiver gain to a desired level.

5. In a TDMA system, apparatus for calibrating a gain of a head end receiver, said apparatus comprising:
   means for monitoring an indication of reception quality;
   means for, upon an indication of excellent reception quality, disconnecting a selected one of at least two antennas;
   means for, while said selected one antenna is disconnected, measuring signal strength at a monitoring point in a receive chain coupled to said selected one antenna; and
   means for, determining receiver gain based on said measured signal strength and a known noise level.

6. The apparatus of claim 5 further comprising means for thereafter adjusting receiver gain to a desired level.

* * * * *